Patented Oct. 5, 1926.

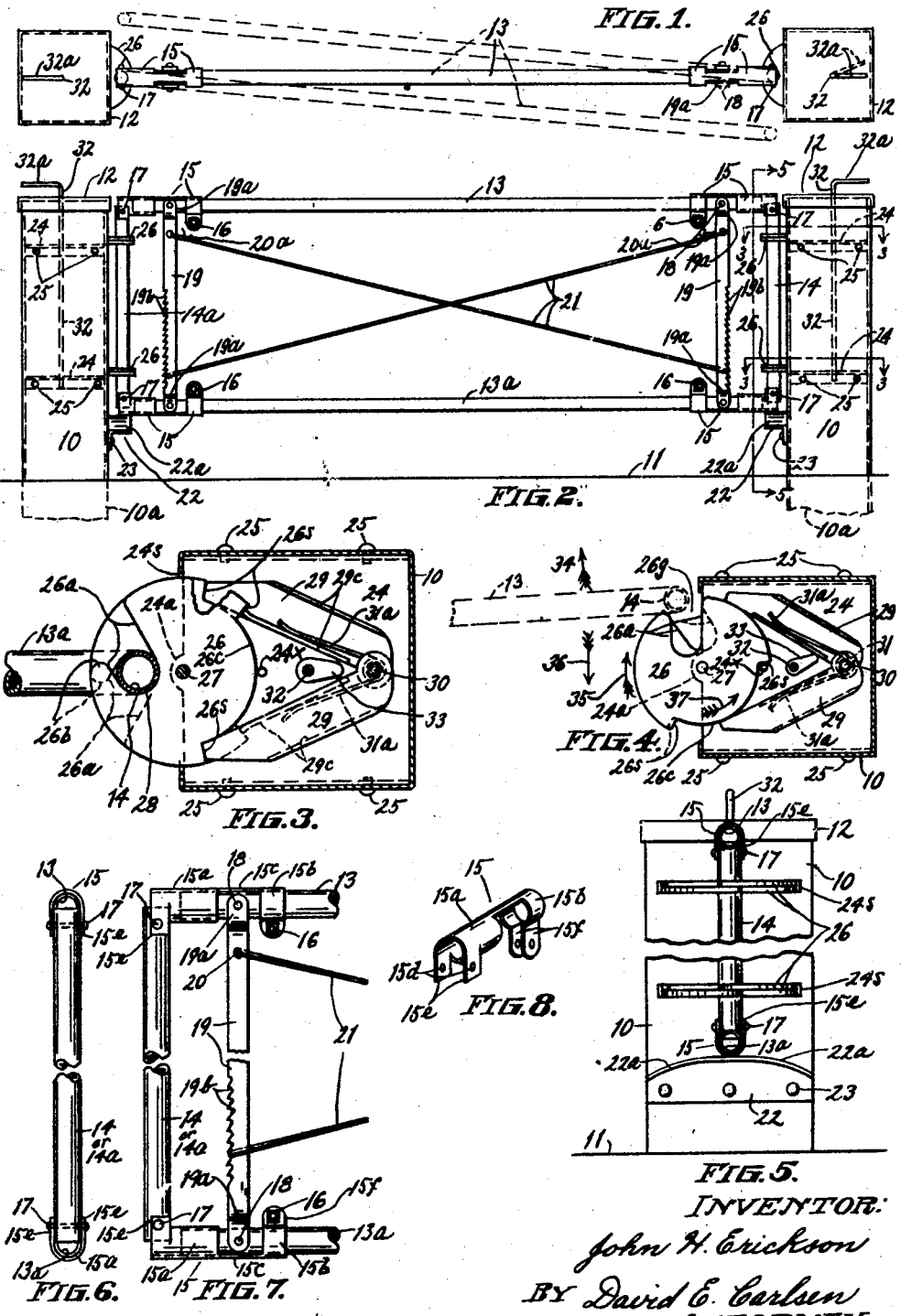

1,601,948

UNITED STATES PATENT OFFICE.

JOHN H. ERICKSON, OF DANIELSON TOWNSHIP, MEEKER COUNTY, MINNESOTA.

GATE.

Application filed October 21, 1925. Serial No. 64,057.

My invention relates to an improved gate and the object is to provide a simple and efficient gate for any fence or wall and which is so constructed as to be non-sagging and may be swung from either end or readily removed without the use of any tools.

In the accompanying drawing:

Fig. 1 is a top view of the gate and its posts.

Fig. 2 is an elevation of Fig. 1.

Fig. 3 is an enlarged sectional detail of either gate post as on either of the lines 3—3 in Fig. 2.

Fig. 4 is Fig. 3 modified and in slightly reduced scale, showing mainly the gate releasing means in operative position.

Fig. 5 is an enlarged elevation of either end post about as on line 5—5 in Fig. 2.

Fig. 6 is an end elevation of the gate alone.

Fig. 7 is an end elevation or face view of the end portion of the gate.

Fig. 8 is a perspective view of the corner sleeve-clamp member of which one is used at each corner of the gate.

Referring to the drawing by reference numerals 10 designates two gate posts suitably set in the ground 11 as at $10^a$, said posts being counterparts and each comprising preferably a hollow post preferably square in cross section and having a suitable shallow cover or cap 12.

The gate proper is of the usual elongated quadrangular form and the frame of which comprises upper and lower parallel bars 13 and $13^a$ respectively and vertical end bars 14—$14^a$, all pivotally and rigidly connected by four sleeve members 15 of which one is fixed at each end of both horizontal gate bars. The bars 13—14 are preferably made of wrought iron pipe or other suitable tubing. The sleeve members 15 comprise each two linearly arranged collars $15^a$ and $15^b$ connected by an integral bar $15^c$, the outer collar $15^a$ having its extremity formed with two parallel ears $15^e$ with registering apertures $15^d$, and the inner collar $15^b$ is formed as a clamp with two parallel ears $15^f$ with apertures $15^g$ for a clamping bolt 16 (see Figs. 2 and 7).

The sleeves 15 are placed one on each end of bars 13—$13^a$ with the end of the bar within the part $15^a$ and the ears $15^e$ pivotally secured on and straddling the adjacent end of a bar 14 as on a bolt or other pin 17. That part of the bar 13 between the two sleeve parts $15^a$ and $15^b$ is drilled diametrically for a pivot pin 18 serving as a fulcrum for the forked ends $19^a$ of two vertical flat bars 19 of which one will thus be located parallel with and close to each end bar 14 (see Figs. 2 and 7). Each bar 19 is provided in its edge adjacent bar 14 with ratchet teeth $19^b$ and in its upper part with an aperture 20. A wire 21 is passed through each aperture 20 thence diagonally downward toward and around the lower part of the opposite bar 19 to engage with one of the ratchet teeth on the latter, thence back again toward the aperture 20 near which the ends of the wire are suitably connected as at $20^a$. Each wire 21 is thus an elongated loop and the gate is kept from sagging at either end by simply engaging the wire in any one of the ratchet teeth which will keep the wires taut when the gate is in proper horizontal position.

In my improved gate construction I provide on the adjacent faces of the fence posts a resting block 22 each of angular shape in cross section and secured as at 23, each block having a ledge $22^a$ sloped downwardly both ways from the center of the post (see Figs. 2 and 5) so that in closing the gate its lower free end if slightly sagging will contact with said slope and be guided to the highest and central part where the gate will rest on it until opened again.

24 are horizontal shelves fixed as at 25 preferably two in each post spaced vertically some distance apart. At the level of each shelf the post has a slot $24^s$ in its gate side and normally occupied each by a pair of horizontally disposed discs 26 on a common pivot 27 in a projection $24^a$ of the shelf in said opening. Both discs of each pair are approximately circular each having a tangential outwardly directed aperture or opening $26^a$ but the lower disc is laid inverted relative to the upper one and therefore the two apertures $25^a$ when aligned approximately vertically are directed oppositely horizontally (as in Fig. 3) forming two overlapping horns $26^b$ at the perimeter of the discs between which horns and the inner ends of the slots is formed an approximately circular opening 28 in which is pivotally retained either of the vertical gate members 14.

With all the disc members 26 in the interlocked position shown in Fig. 3 it is obvious that the gate is securely held between the posts 10 and is further securely held by two cams 29 (see Figs. 3 and 4) fulcrumed at 30 in each shelf 24 one pair of such cams back of each pair of discs. The inner edges of each pair of discs 26 comprises a reduced concentric arc 26ᶜ providing two radial shoulders 26ˢ.

The cams 29 are normally arranged in V-shape and bear with their free ends pressed against the circular or arched faces 26ᶜ of the discs by the arms 31ª of a coil spring 31 about the pivot 30 and between the two cams (see Figs. 3 and 4). When the discs are in the position shown in Fig. 3 they serve as hinges for the gate, the discs being held rigid by the ends of both cams engaging behind the shoulders 26ˢ, one cam holding the upper disc and the other the lower disc. The cams are made in shallow channel shape with flanges 29ᶜ. In each cam the inner flange is short and its end contacts with the adjacent shoulder of the opposite disc to the one its end is engaged with (see the upper cam in Fig. 3). Thus both discs 26 have both their shoulders 26ˢ engaged by the cams simultaneously.

32 is a vertically disposed shaft journaled in both shelves 24 of each post and extending upwardly through the cover 12 above which the shaft is bent to horizontal to provide a hand lever 32ª. 33 is a secondary cam secured on shaft 32, one just above each shelf 24 and between each pair of cams 29. When any one desires to open the gate he simply turns lever 32ª as to dotted position in Fig. 1 causing both the secondary cams on the shaft 32 (Fig. 4) to bear against one of the main cams 29 and spring it outwardly. Then the gate may be swung free from the discs by pulling it in the direction of arrow 34 (Fig. 4) and the discs 26 will be rotated in direction of arrow 35 causing their gaps 26ª to be practically in alinement vertically and providing an exit opening 26ᵍ (Fig. 4) through which the gate bar 14 may pass. If the operator desires to open the gate the other way as in direction of arrow 36 (Fig. 4) he first pushes lever 32ª in the opposite direction from that just described and the discs 26 are free to rotate in direction of arrow 37 (Fig. 4) and the end bar 14 of the gate will be pushed past the fulcrum 27 and the opening 26ᵍ will be on the other side of said fulcrum from that illustrated. It is obvious that during these operations for releasing the gate at one post the discs in the opposite post remain in the locked position and serve as hinges although the opposite gate bar 14 simply is oscillated in the interlocked discs of said opposite post. It is now also obvious that either end gate post 14 may be released while the other post 14 is thus hinged, or both ends may be released and the gate removed entirely when so desired.

24ˣ in Figs. 3 and 4 is a stud provided one in each shelf 24 and close to the faces 26ᶜ and against which the shoulders 26ˢ are stopped to thus limit the rotation of the discs.

I claim:

1. A two-way gate and posts therefor, said gate comprising a normally quadrangular frame with two vertical end members and two horizontal members all pivotally connected, said posts consisting each of an upright hollow column, means in each post for releasably engaging one of the end members of the gate and means for supporting the adjacent lower corners of the gate; said engaging means in each post consisting of two vertically spaced horizontally disposed pairs of circular discs, each pair on a shelf in the post and partly exposed at the side of the post adjacent the gate, outwardly directed tangential notches in said discs, one in each disc, the notch in one disc of each pair directed oppositely to the notch in the other disc; the notches in each pair of discs adapted to partly overlap so that a gate end member may be retained in the notches, and means for holding all the discs in set position to hold the gately firmly and to release said discs in either post to permit the disc notches to be aligned and release the gate.

2. A two-way gate and posts therefor, said gate comprising a normally quadrangular frame with two vertical end members and two horizontal members all pivotally connected, said posts consisting each of an upright hollow column, means in each of said posts for releasably engaging one of the end members of the gate and means for supporting the adjacent lower corner of the gate; said gate engaging means in each post consisting of two vertically spaced horizontally disposed pairs of circular discs pivoted each pair on a shelf in the post and partly exposed at the side of the post adjacent the gate, outwardly directed tangential notches in said discs, one in each disc, the notch in one disc of each pair directed oppositely to the notch in the other disc, the notches in each pair of discs adapted to partly overlap so that a gate end member may be retained in the notches, and means for holding all the discs in said retaining position and to release said discs for the purpose described; said discs having each a reduced arcuate edge at its inner side providing two radial shoulders, two cams pivoted on a common pivot on the shelf rearward of each pair of discs and extending forward in V-formation, spring means pressing said cams toward each other, the forward ends of the cams adapted to simultaneously engage the adjacent shoulders of the discs at one side of a line through the disc pivot and the cam pivot, and means for releasing the cams in each post from engagement with said shoulders selectively at either side of said line.

In testimony whereof I affix my signature.

JOHN H. ERICKSON.